United States Patent
Wang

(10) Patent No.: US 12,411,798 B2
(45) Date of Patent: Sep. 9, 2025

(54) METHODS AND APPARATUSES FOR REMOTE DIRECT MEMORY ACCESS PAGE FAULT HANDLING

(71) Applicant: HUAWEI TECHNOLOGIES CO., LTD., Shenzhen (CN)

(72) Inventor: Zixiong Wang, Kanata (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 117 days.

(21) Appl. No.: 18/220,962

(22) Filed: Jul. 12, 2023

(65) Prior Publication Data

US 2025/0021515 A1 Jan. 16, 2025

(51) Int. Cl.
*G06F 15/17* (2006.01)
*G06F 11/07* (2006.01)
*G06F 15/173* (2006.01)

(52) U.S. Cl.
CPC ...... *G06F 15/17331* (2013.01); *G06F 11/073* (2013.01); *G06F 11/0793* (2013.01)

(58) Field of Classification Search
CPC ............. G06F 15/17331; G06F 11/073; G06F 11/0793
See application file for complete search history.

(56) References Cited

U.S. PATENT DOCUMENTS

| | | | | |
|---|---|---|---|---|
| 2004/0172521 A1* | 9/2004 | Hooker | ................. | G06F 9/3838 |
| | | | | 712/E9.046 |
| 2012/0331065 A1* | 12/2012 | Aho | ...................... | G06F 15/167 |
| | | | | 709/206 |
| 2020/0097313 A1* | 3/2020 | Dong | ................... | G06F 12/1036 |

* cited by examiner

*Primary Examiner* — Jae U Yu

(74) *Attorney, Agent, or Firm* — Troutman Pepper Locke LLP; Tim Tingkang Xia, Esq.

(57) ABSTRACT

A method for performing a remote direct memory access (RDMA) read command includes reserving a memory space in a buffer to receive data associated with an address range, sending a RDMA read instruction to a remote module to request the data, and receiving the data from the remote module. A method for performing a RDMA write command includes receiving from a remote module a request to send command requesting to send data associated with an address range, reserving a memory space in a buffer to receive data associated with the address range, sending a RDMA read instruction to the remote module, and receiving the data from the remote module.

20 Claims, 9 Drawing Sheets

METHODS AND APPARATUSES FOR REMOTE DIRECT MEMORY ACCESS PAGE FAULT HANDLING

FIELD OF THE DISCLOSURE

The present disclosure relates generally to virtual computing environments, and in particular to methods and apparatuses for page fault handling for read and write operations using remote direct memory access.

BACKGROUND

Low latency of data transmission has become a key requirement in many critically important computing applications such as data center applications having a cloud-based architecture. Remote direct access memory (RDMA) technologies are commonly used in communication networks to reduce latency and have demonstrated superior latency performance as compared to other technologies such as the use of the transmission control protocol based schemes. However, adoption of RDMA technologies in cloud-based architectures, including for data center applications have been limited due to performance issues as associated memory pages generally require static pinning, which may be unacceptable in many cases due to the resulting effect of poor resource utilization in dynamic multi-tenant environments. Alternatively, the use of on demand paging technologies in cloud-based architectures, including for data center applications may unacceptably increase application latency and degrade application performance.

SUMMARY

Embodiments disclosed herein relate to the use of RDMA read commands to retrieve data from remote computing modules, wherein buffer space in the requesting computing module is reserved in advance of sending a RDMA read command to prevent buffer overflows. Further, embodiments disclosed herein relate to the integration of a RDMA read command in a RDMA write command to similarly prevent buffer overflows in RDMA write operations.

According to one aspect of this disclosure, a method comprises reserving a memory space in a buffer to receive data associated with an address range; sending a RDMA read instruction to a remote module to request the data; and receiving the data from the remote module.

In some embodiments, the method further comprising dividing the address range into two or more address range segments, wherein sending the RDMA read instruction comprises sending the RDMA read instruction to request data associated with each address range segment.

In some embodiments, the method further comprises checking a page fault bitmap for a page fault, the page fault where a page in the page fault bitmap overlaps with the address range; and waiting for resolution of the page fault.

In some embodiments, the method further comprises fetching a work queue element, the work queue element for generating the RDMA read instruction.

In some embodiments, the method further comprises storing a completion event in a completion queue.

According to one aspect of this disclosure, a method comprises receiving from a remote module a request to send command requesting to send data associated with an address range; reserving a memory space in a buffer to receive data associated with the address range; sending a RDMA read instruction to the remote module; and receiving the data from the remote module.

In some embodiments, the method further comprises extracting a tag of the request to send command; checking for a matching work queue element matching the tag; and generating the RDMA read instruction from the matching work queue element.

In some embodiments, wherein the matching work queue element is not found, the method further comprises storing the request to send command in a miss buffer; signaling a container regarding the miss buffer; waiting for confirmation from the container for resolution of the request to send command in the miss buffer; and checking for the matching work queue element matching the tag.

In some embodiments, wherein the request to send command comprises an address offset, a data length, a tag, a source queue pair identification, and a destination queue pair identification.

In some embodiments, the method further comprises extracting the address offset, the data length, the tag, the source queue pair identification, and the destination queue pair identification from the request to send command; checking a tag context table using the tag to obtain an identification of a memory region and a base address of the memory region; and calculating a data start memory address, wherein the data start memory address is the sum of the base address and the address offset.

In some embodiments, the method further comprises sending a completion signal to the remote module.

In some embodiments, the method further comprises checking a page fault bitmap for a page fault, a page fault where a page in the page fault bitmap overlaps with the address range; and waiting for resolution of the page fault.

According to one aspect of this disclosure, an apparatus comprises a memory; and one or more processors for executing instructions stored in the memory for performing RDMA instructions, the instructions comprising reserving memory space in a buffer to receive data associated with an address range; sending a remote direct memory access (RDMA) read instruction to a remote module to request the data; and receiving the data from the remote module.

In some embodiments, the apparatus is further for dividing the address range into two or more address range segments, wherein sending the RDMA read instruction comprises sending the RDMA read instruction to request data associated with each address range segment.

In some embodiments, the apparatus is further for checking a page fault bitmap for a page fault, the page fault where a page in the page fault bitmap overlaps with the address range; and waiting for resolution of the page fault.

In some embodiments, the apparatus is further for fetching a work queue element, the work queue element for generating the RDMA read instruction.

According to one aspect of this disclosure an apparatus comprises a memory; and one or more processors for executing instructions stored in the memory for performing RDMA instructions, the instructions comprising receiving from a remote module a request to send command requesting to send data associated with an address range; reserving memory space in a buffer to receive data associated with the address range; sending a RDMA read instruction to the remote module; and receiving the data from the remote module.

In some embodiments, the apparatus is further for extracting a tag of the request to send command; checking for a matching work queue element matching the tag; and generating the RDMA read instruction from the matching work queue element.

In some embodiments, wherein the matching work queue element is not found, the apparatus is further for storing the request to send command in a miss buffer; signaling a container regarding the miss buffer; waiting for confirmation from the container for resolution of the request to send command in the miss buffer; and checking for the matching work queue element matching the tag.

In some embodiments, the request to send command comprises an address offset, a data length, a tag, a source queue pair identification, and a destination queue pair identification.

In some embodiments, the apparatus is further for extracting the address offset, the data length, the tag, the source queue pair identification, and the destination queue pair identification from the request to send command; checking a tag context table using the tag to obtain an identification of a memory region and a base address of the memory region; and calculating a data start memory address, wherein the data start memory address is the sum of the base address and the address offset.

In some embodiments, the apparatus is further for checking a page fault bitmap for a page fault, a page fault where a page in the page fault bitmap overlaps with the address range; and waiting for resolution of the page fault.

BRIEF DESCRIPTION OF THE DRAWINGS

For a more complete understanding of the disclosure, reference is made to the following description and accompanying drawings, in which.

DETAILED DESCRIPTION

Remote direct memory access (RDMA) is an extension of direct memory access (DMA) that permits DMA of memory of one computing device by another computing device without involvement of central processing units of the computing devices. The use of RDMA permits applications to directly exchange data using DMA memory semantics without involvement of a host kernel, thus delivering low latency and high performance.

As those skilled in the art will appreciate, the methods, instructions, and processes disclosed herein may be implemented as one or more software and/or firmware programs having necessary computer-executable code or instructions and stored in one or more non-transitory computer-readable storage devices or media which may be any volatile and/or non-volatile, non-removable or removable storage devices such as random access memory, read-only memory, electrically erasable programmable read-only memory, solid-state memory devices, hard disks, compact discs, digital video discs, flash memory devices, and/or the like. Apparatus may read the computer-executable code from the storage devices and execute the computer-executable code to perform the processes.

Alternatively, the methods, instructions, and processes disclosed herein may be implemented as one or more hardware structures having necessary electrical and/or optical components, circuits, logic gates, integrated circuit chips, and/or the like.

Figure 1:
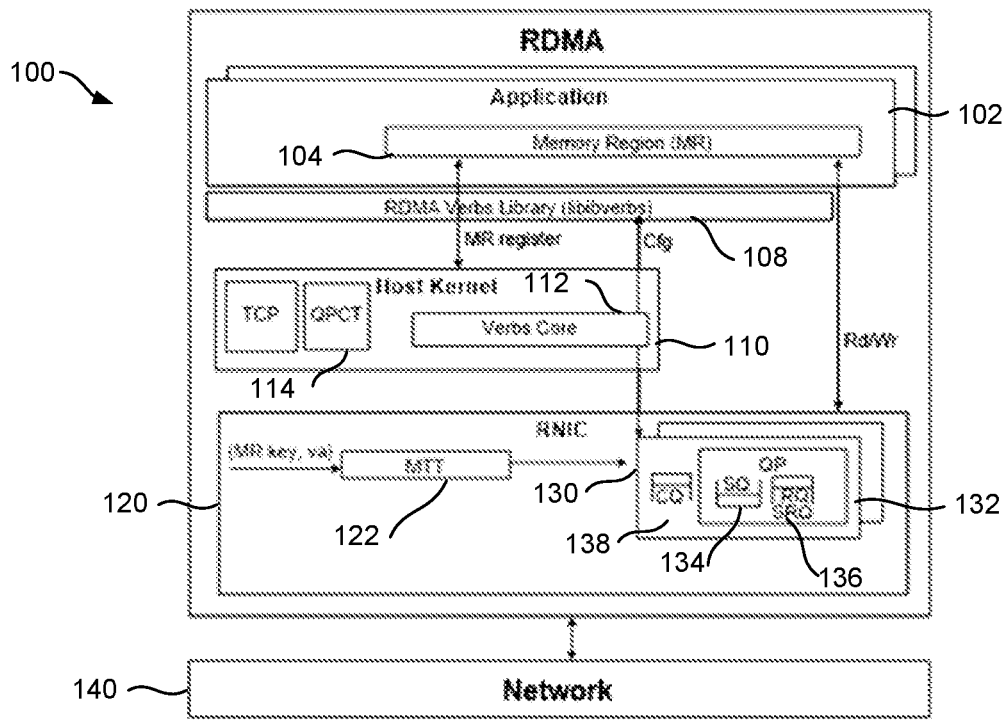
FIG. 1 is a schematic diagram of a conventional computing module in a RDMA network.

Referring to FIG. 1, a RDMA architecture 100 may comprise an application module 102, a RDMA verb library 108, a host kernel 110, and a RDMA network interface card (RNIC) 120. The application module 102 may comprise one or more memory regions 104. The RDMA verb library 108 may be implemented using a user space verbs library, such as libibverbs, and the host kernel 110 may comprise a verbs core 112. The RNIC 120 may comprise one or more queues 130 for implementing low latency communication and may include a send and receive queue pair (QP) 132 and completion queue (CQ) 138. The QP 132 may comprise a send queue (SQ) 134 and a receive queue (RQ) 136. The SQ 134 may be for sending RDMA commands to a remote receiver over a network 140 and the RQ 136 may be for receiving RDMA commands form a remote sender through the network 140. In some embodiments of the present disclosure, multiple SQs 134 may share a RQ 136 and may be referred to as a share receive queue (SRQ).

The SQ 134 is for storing one or more work queue elements, where each work queue element may be similar to a DMA descriptor, and may be used to generate one or more RDMA commands, such as read, write, and/or the like.

The CQ 138 may be for buffering RDMA command completion events.

The QP 132 and CQ 138 may be in application memory address space, and may be accessed by the RNIC 120 and the kernel 110 as well. The QP 132 and the CQ 138 are shown in the RNIC 120 in FIG. 1, but in other embodiments, the QP 132 and the CQ 138 may be in host memory as the RNIC may not have sufficient memory capacity for such a configuration.

An application may be allocated a memory region 104 for zero-copy access by the RNIC 120, wherein zero-copy access is where the RNIC 120 may access memory directly to reduce the number of copies that may be created or used, such as when memory is accessed by the kernel 110. The memory region 104 may be protected with local and/or remote memory region security keys. The host kernel 110 may maintain association of QPs using a QPC table 114. The RNIC 120 may use a memory address translation table 122 for translating an application's virtual address (va) to a physical memory address.

For each RDMA command, a call initiator refers to a processor and a RNIC that generate the RDMA command, while a target refers to a processor and a RNIC that receive a RDMA command and execute associated remote data movement. Further, RDMA commands may be split into at least two types of commands, being one-sided commands and two-sided commands. For one-sided commands, such as RDMA read and write commands, a processor of a target of the RDMA command is not involved in the data movement resulting from the RDMA command. Conversely, for two-sided commands, such as RDMA send and receive commands, a processor of a target of the RDMA command is involved in the data movement results from the RDMA command.

Dynamic memory management is often disabled for memory regions to avoid potential page faults, as RNICs are required to perform read and write accesses to memory regions having unpredictable access times and page locations. For example, if dynamic memory management were used in a system, a memory page in a memory region may be idle and reallocated to another application. Then, when a RNIC begins to access the memory page, a page fault would occur as the memory page was reallocated when it was idle.

Figure 2:
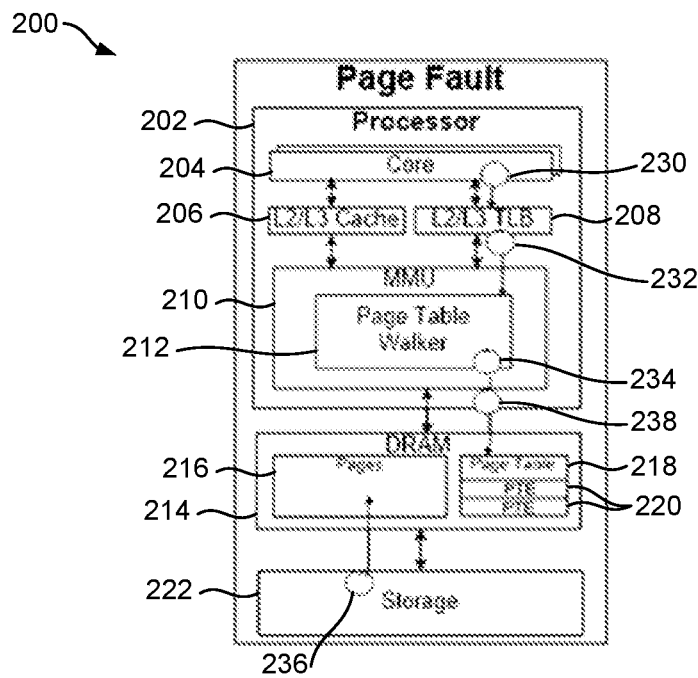
FIG. 2 is a schematic diagram of a hypervisor for page fault handling in a RDMA network.

Referring to FIG. 2, in some embodiments of the present disclosure, a hypervisor 200 of a server comprises a processor 202, dynamic random-access memory (DRAM) 216, and memory storage 222. The processor 202 comprises a central processing unit (CPU) core 204, a level 2 (L2) and a level 3 (L3) cache 206, a L2 and L3 translation lookaside buffer (TLB) 208, and a memory management unit (MMU), the MMU 210 comprising a page table walker 212. The DRAM 216 comprises a plurality of pages 216 and a page table 218, the page table 218 comprising a plurality of page table entries (PTEs) 220.

Referring to FIG. 2, the hypervisor 200 may maintain a page table 218 for the DRAM 216, wherein each PTE 220 comprises a present-bit (P-Bit) for indicating whether or not an associated page is in DRAM 216, or host memory. A page fault occurs when an application attempts to access memory where the PTE 220 has a P-Bit that is clear indicating the associated page is not in the DRAM 216 and an interrupt is raised. The hypervisor 200 may handle a page fault interrupt to resolve it as follows. At step 230, the CPU core 204 may access the L2 and L3 TLB 208. At step 232, if a TLB 208 miss occurs, a page fault interrupt is triggered, and the page table walker 212 resolves the page fault interrupt resulting in long latency for interrupt handling. At step 234, the page table walker 212 searches an associated PTE 220 in the page table 218. If the P-Bit in the PTE 220 is set, the page is in host memory and the page address is inserted into the TLB 208 then the page fault interrupt is cleared. Alternatively, at step 236, if the P-Bit in the PTE 220 is clear, the page is in the storage 222 and swapped from the storage 222 into the DRAM 214. At step 238, the P-Bit is then set, the page fault is resolved, and the page fault interrupt is cleared.

Page fault handling in this manner may result in long periods of latency. During latency periods, when a RNIC 120 stores a received packet into a memory page, a page fault may occur as the page is not in a kernel's page table. The received packet would then need to be buffered. However, when the latency for the kernel or RNIC to handle the page fault persists for such a period of time that RNIC does not have adequate buffer capacity, the buffer may also overflow resulting in a buffer overflow. A buffer overflow would result in a loss of RDMA packets because target memory pages are not readily available.

To prevent such packet loss resulting from buffer overflow, all memory pages in a memory region may be statically pinned during a RDMA initialization phase. As a result, the pinned memory pages may not be used by other applications, including when they are idle and not in use. While this addresses the potential for buffer overflow, it may result in significantly inefficient memory use and may be overly restrictive for dynamic data center environments comprising multiple applications and multiple tenants. As a result, RDMA has generally not been widely adopted for data center environments, and has been deployed in a limited set of applications.

Figure 3:
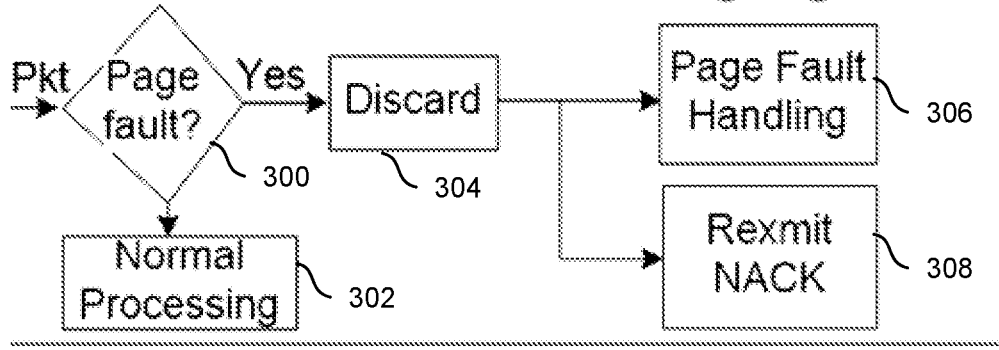
FIG. 3 is a block diagram illustrating conventional RDMA on demand paging.

One method to address this issue is a RDMA standard comprising on demand paging page fault handling. Referring to FIG. 3, upon receipt of a packet by a RNIC, at step 300, the RNIC refers to a page table to determine whether a page fault has occurred. If not, normal processing of the packet occurs at step 302. If a page fault has occurred, the RNIC discards the received packet at step 304, initiates page fault handling at step 306, and returns a selective retransmission negative acknowledgement to a remote sender at step 308. The remote sender would then retransmit the packet. The use of on demand paging may result in increases to application latency and may degrade application performance.

Figure 4:
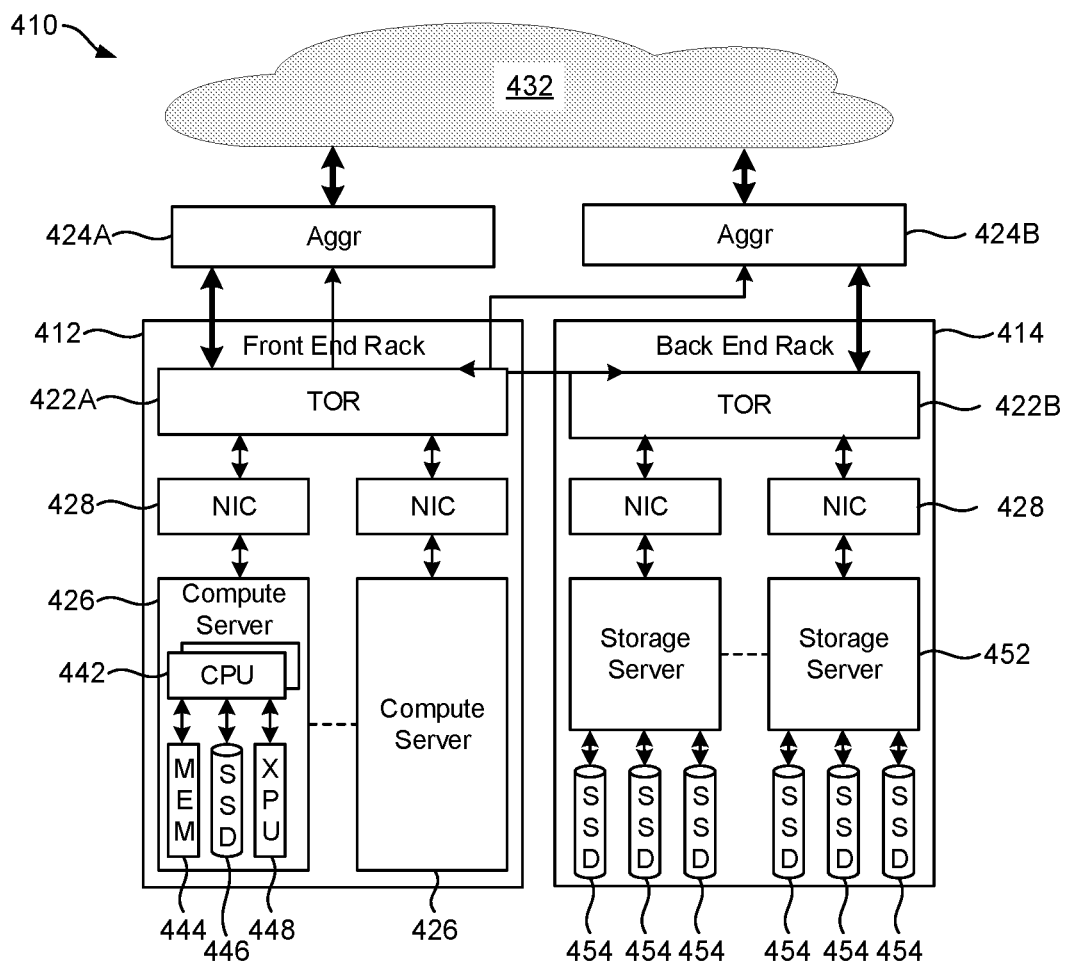
FIG. 4 is a schematic diagram showing the architecture of a conventional data center.

FIG. 4 is a schematic diagram showing the architecture of a conventional data center 410. The data center 410 usually comprises a front end dedicated for computing using computer servers and a back end dedicated for storage using storage servers. The front and back ends comprise one or more front-end racks 412 and one or more back-end racks 414, respectively. As those skilled in the art understand, a data-center rack such as a front-end rack 412 or a back-end rack 414 is a physical structure (such as a steel framework structure) with necessary electronic components and wiring for housing various computing devices such as servers, networking devices, cables, and/or the like, and provides equipment placement and orchestration in the data center facility.

As shown in FIG. 4, each front-end rack 412 comprises a top-of-rack (TOR) switch 422A (which is a network switch usually placed at the top of the rack) connected to one or more aggregation switches 424A (which is a network switch for interconnecting multiple racks 412 and 414 in the data center 410). One or more computer servers 426 are deployed on the front-end racks 412 and connect to the TOR switch 422A of the front-end rack 412 via an internal or external network interface card (NIC) 428 for accessing a network 432 (such as the Internet) or devices on other racks via the TOR switch 422A and the aggregation switch 424A. Each computer sever 426 comprises various computing resources such as one or more central processing units (CPUs) 442, one or more memory units 444, one or more storage units 446 such one or more solid-state drives (SSDs), one or more programmable and/or configurable acceleration processors 448 such as one or more graphic processing units (GPUs), one or more DPUs, one or more tensor processing units (TPUs), one or more field-programmable gate arrays (FPGAs), and/or the like (collectively denoted "xPUs").

Each back-end rack 414 comprises a TOR switch 422B connected to an aggregation switch 424B. One or more storage servers 452 are deployed on the back-end racks 414 and connect to the TOR switch 422B of the back-end rack 414 via an internal or external NIC 428 for accessing the network 432 or devices on other racks via the TOR switch 422B and the aggregation switch 424B. Each storage server 452 generally comprises a controller (not shown) controlling one or more non-volatile storage units 454 such as one or more hard drives, one or more SSDs, and/or the like.

In the following, various embodiments of a data-center architecture are disclosed, which provide disaggregation of computing resources with data-centric heterogeneous computing. More specifically, the data-center architecture disclosed below divides hardware resources into physically separated and circuitally interconnected hardware assemblies so that the hardware resources may be more efficiently shared and accessed.

Figure 5:
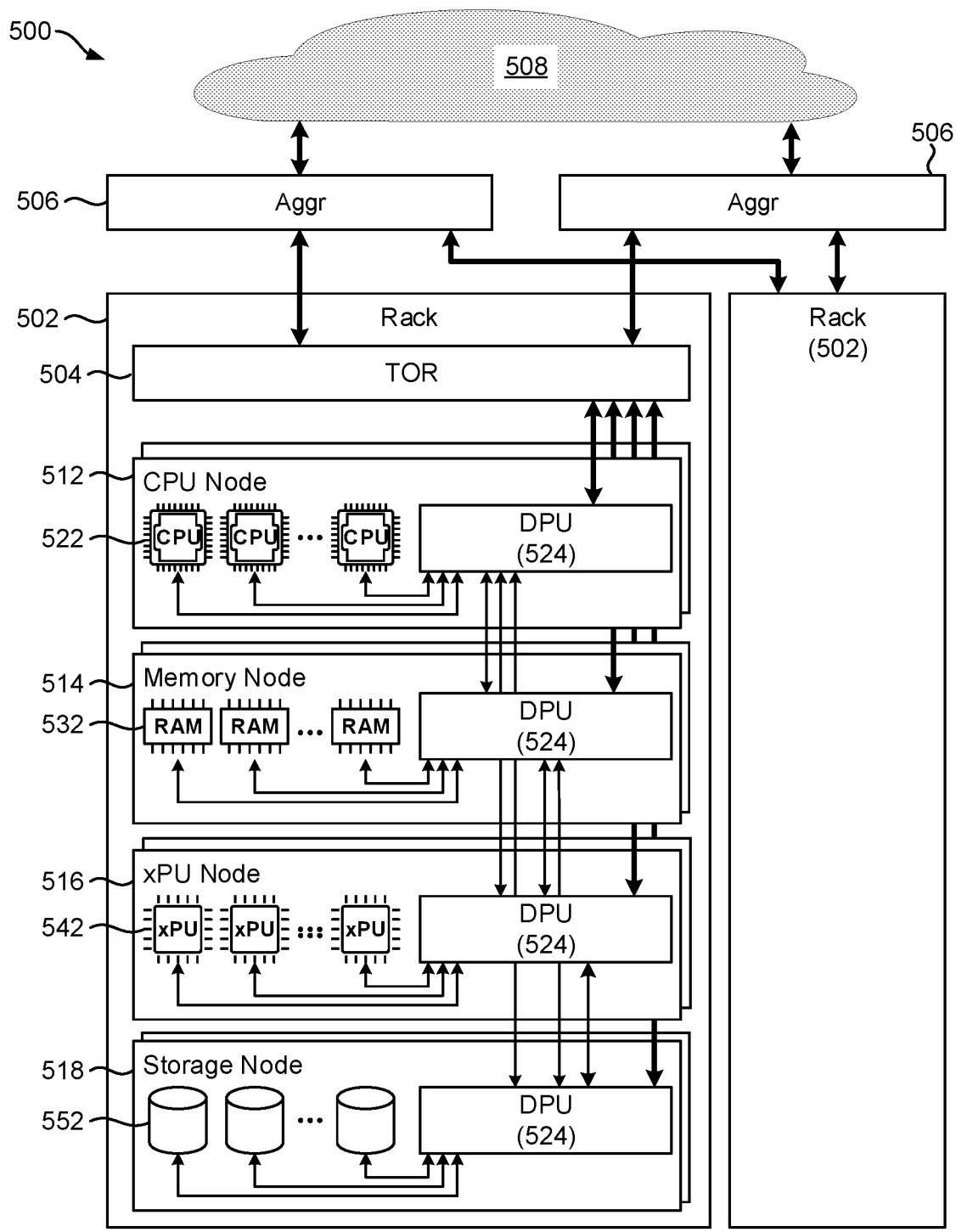
FIG. 5 is a schematic diagram showing the architecture of a data center according to some embodiments of this disclosure.

FIG. 5 is a schematic diagram showing the architecture of a data center 500 according to some embodiments of this disclosure. As shown, the data center 500 comprises one or more racks 502. Each rack 502 comprises a TOR switch 504 connected to one or more aggregation switches 506 for functionally connecting various components, assemblies, and devices on the rack 502 to a network 508 and to the components, assemblies, and devices on other racks.

In these embodiments, the hardware components for computing and depository (similar to those of the computer servers 426 and storage servers 452 shown in FIG. 4) are organized into physically separated and circuitally interconnected hardware assemblies (also denoted "pools" or "nodes") according to their types. For example, as shown in FIG. 5, the data center 500 comprises one or more CPU nodes 512, one or more memory nodes 514, one or more ACC or xPU nodes 516, and one or more storage nodes 518 for deployment to the one or more racks 502. Of course, those skilled in the art will appreciate that, in other embodiments, the data center 500 may further comprise other types of nodes as needed.

Each node generally comprises a plurality of same-type hardware components for computing or storage and a DPU, which is a programmable processor specialized for use in data-center infrastructure and streaming applications for processing networking packets, storage requests, analytics requests, and/or the like) for managing communication of the hardware components of the node with other nodes, other devices, and/or the network 508. In some embodiments, each node may also comprise a printed circuit board (PCB) or any suitable circuitry having a plurality suitable connection interfaces for receiving the hardware components of the node and establishing communication between the hardware components and between the hardware components and the DPU thereof.

Figure 6:
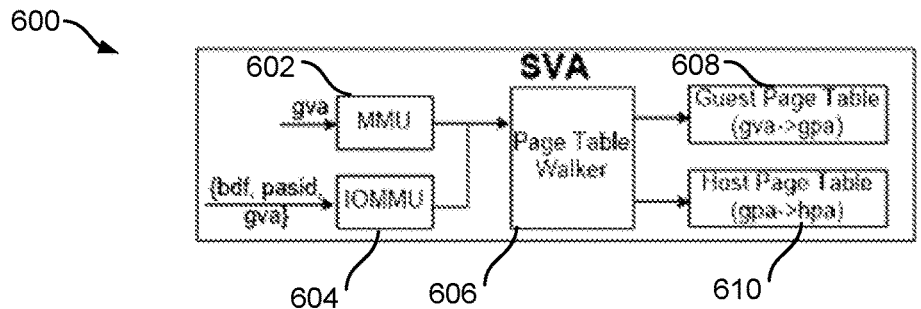
FIG. 6 is a schematic diagram of components of a computing module for providing shared virtual address support according to some embodiments of this disclosure.

Many different processor architectures comprise input-output memory management unit (IOMMU), system memory management unit (SMMU), and/or the like support for shared virtual address (SVA) technologies, which allow input and output devices such as smart network interface cards (smartNICs), RNICs, and DPUs for accessing memory pages managed by processors with embedded MMUs. Referring to FIG. 6, a processor 600 comprises an integrated MMU 602 and an integrated IOMMU 604. The MMU 602 and the IOMMU 604 share access to a common guest page table 608 and a common host page table 610 using a common page table walker 606, all integrated inside the processor 600.

Embodiments of the present disclosure may be used and is compatible in a variety of applications including for systems using the peripheral component interconnect express (PCIe)/compute express link (CXL) specification. The PCIe/CXL specification supports identification of an application using bus device function (BDF) and software process identification (PASID). When SVA is used, an IOMMU may map tuples comprising BDF and PASID ({BDF, PASID}) into a particular address protection domain.

In some embodiments of the present disclosure, a smartNIC, a RNIC, or a DPU may use SVA to access host DRAM for memory regions. Specifically, a memory may be located in virtual address space of a normal application or guest virtual address space of a virtualized application in a container or a virtual machine (VM).

A smartNIC, a RNIC, or a DPU may access a memory region in a host DRAM for a particular virtual address of a program. A specific memory region may be accessed through the use of tuples comprising the BDF, the PASID, and the virtual address ({BDF, PASID, va}), where the BDF is configured for the associated RNIC or virtualized RNIC in a smartNIC or a DPU.

A smartNIC, a RNIC, or a DPU may also access a memory region in a host DRAM for a particular guest virtual address (gva) of a container or a VM. A specific memory region may be accessed through the use of tuples comprising the BDF, the PASID, and the guest virtual address ({BDF, PASID, gva}), where the BDF is the configured for the associated RNIC or virtualized RNIC in a smartNIC or a DPU.

However, for RDMA, additional memory protections are required for memory region accesses originating from applications in a local servers, also referred to as local RDMA accesses, as well as for memory region accesses originating from applications in remote services, also referred to as remote RDMA accesses. A local RDMA access may occur when the key of the local RDMA access matches a configured local key, l-key. A remote RDMA access may occur when the key of the remote RDMA access matches a configured remote key, r-key.

To implement the above described memory protections, a memory region may be assigned two PASIDs: a local PASID, PASID-1, for local RDMA accesses, and a remote PASID, PASID-r, for remote RDMA accesses. As a result, for local RDMA accesses to a memory region, a smartNIC, a RNIC, or a DPU may access an associated memory region in host DRAM using a tuples of ({BDF, PASID-1, va}) or ({BDF, PASID-1, gva}). Similarly, for remote RDMA accesses to a memory region, a smartNIC, a RNIC, or a DPU may access an associated memory region in host DRAM using a tuples of ({BDF, PASID-r, va}) or ({BDF, PASID-r, gva}).

In virtualized computing environment such as for a data center or a cloud-based architecture, a tenant may run in multiple containers. To provide high performance and low latency communication for particular applications using such a structure while supporting isolation among tenants, each container may have its own RDMA instance, called a guest RDMA (gRDMA). The use of gRDMAs may be referred to as RDMA virtualization.

Figure 7:
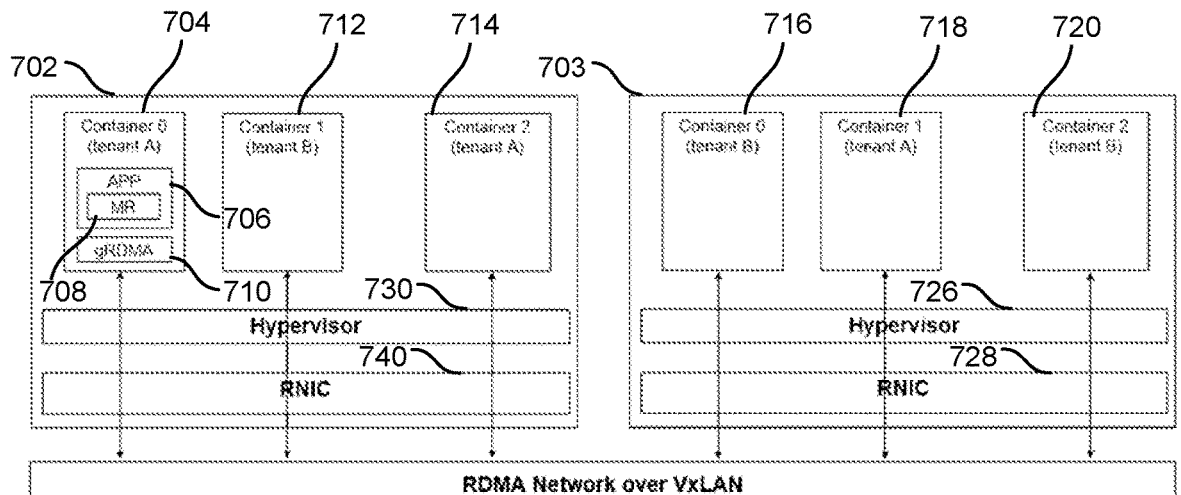
FIG. 7 is a schematic diagram of a RDMA network over virtual extensible local area network (VxLAN) according to some embodiments of this disclosure.

Referring to FIG. 7, an RDMA network 700 is configured to operate over a encapsulation protocol, such as virtual extensible local area network (VxLAN). The RDMA network 700 comprises computing resources such as a first computing module 702 and a second computing module 703, each of the computing modules 702 and 703 comprising containers, hypervisors, and RNICs. The first computing module 702 comprises a first container 704, a second container 712, and a third container 714. The second computing module 703 comprises a fourth container 716, a fifth container 718, and a sixth container 720. The first container 704, the third container 714, and the fifth container 718 are for tenant A while the second container 712, the fourth container 716, and the sixth container 720 are for tenant B. The first container 702 further comprises a hypervisor 730 and a RNIC 740 and the second container 703 further comprises a hypervisor 726 and a RNIC 728. Each container 704, 712, 714, 716, 718, and 720 is for a designated application with associated memory region and comprises a gRDMA, wherein gRDMAs are for communicating with other gRDMAs of a common tenant. A group of gRDMAs may form a common virtual network instances. For example, the first container 704 is for an application 706 with an associated memory region 708 and comprises a gRDMA 710. The gRDMA 710 is for communicating with gRDMAs of the third container 714 and the fifth container 718.

Figure 8:
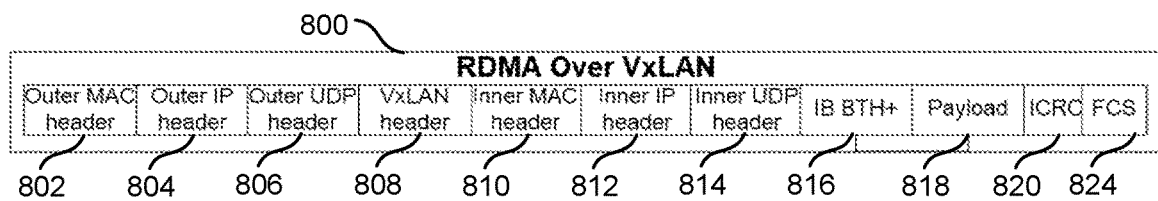
FIG. 8 is a schematic diagram illustrating a RDMA over VxLAN packet according to some embodiments of this disclosure.

Communication between gRDMAs may be achieved using RDMA over VxLAN technology, wherein the frame format may be as shown in FIG. 8 in some embodiments disclosed herein. Referring to FIG. 8, a RDMA over VxLAN frame 800 comprises outer headers, a VxLAN header 808, inner headers, an Infiniband (IB) base transport header (IB BTH+) 816, a payload 818, and IB invariant cyclic redundancy check (ICRC) 820, and an Ethernet frame check sequence (FCS) 824. The outer headers may comprise an outer media access control (MAC) header 802, an outer Internet protocol (IP) header 804, an outer user datagram protocol (UDP) header 806. The inner headers may comprise an inner MAC header 810, an inner IP header 812, and an inner UDP header 814. In some embodiments disclosed herein, for a particular frame, a container's MAC address may be used for the inner MAC header 810 and the container's IP address may be used for the inner IP header 812. Further a host's MAC address may be used for the outer MAC header 802 and the host's IP address may be used for the outer IP header 804.

Figure 9:
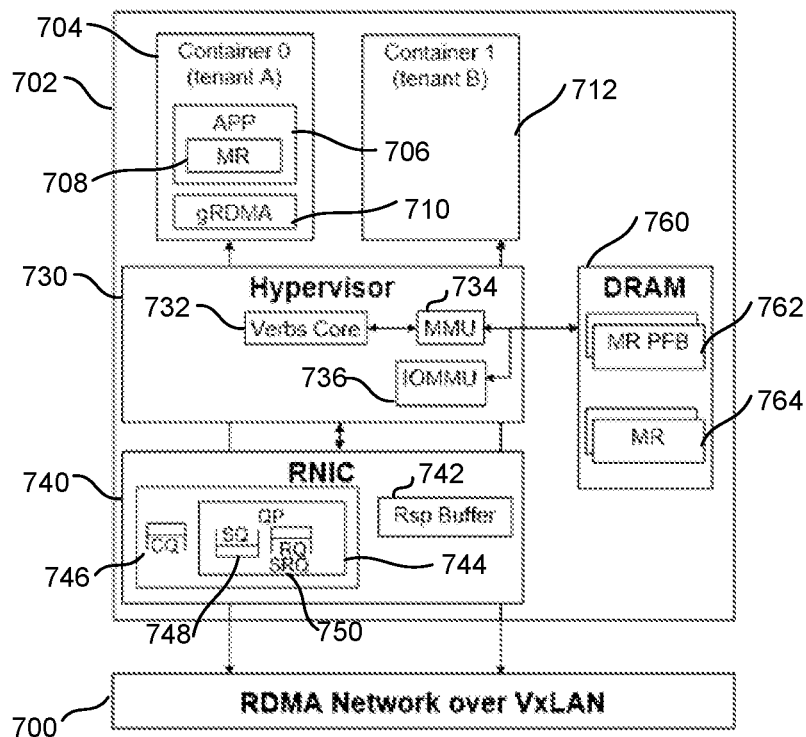
FIG. 9 is a schematic diagram of a computing module of a RDMA network according to some embodiments of this disclosure.

Referring to FIG. 9, in some embodiments of the present disclosure, a RDMA network 700 comprises a first computing module 702, the first computing module 702 comprising a first container 704 and a second container 712, a hypervisor 730, a RNIC 740, and a DRAM module 760. The first container 704 is associated with tenant A and is for an application 706 with an associated memory region 708 and comprises a gRDMA 710. The hypervisor 730 comprises a verbs core 732, a MMU 734, and a IOMMU 436. The RNIC 740 comprises a response buffer 742 and one or more queues. The RNIC 740 may comprise one or more queues for implementing low latency communication and may include a send and receive QP 744 and CQ 746. The QP 744 may comprise a SQ 748 and a RQ 750. In some embodiments of the present disclosure, multiple SQs may share the RQ 750 such that it is referred to as a SRQ. As above, the SQ 748 is for storing one or more work queue elements, where each work queue element may be similar to a DMA descriptor, and may be used to generate one or more RDMA commands, such as read, write, and/or the like. The CQ 746 may be for buffering RDMA command completion events.

The DRAM module 760 may comprise a memory region page fault bitmap 762 and a memory region 764.

The verbs core 732 of the hypervisor 730 and the gRDMA 710 of the first container 704 may receive a page fault interrupt from the memory management unit 734 in the hypervisor 730. The verbs core 732 and the gRDMA 710 maintain the page fault bitmap 762 in the DRAM module 760 based each of the received page faults. Each bit in the page fault bitmap 762 is associated with a page in the memory region 764. A set bit in the page fault bitmap 762 means that the associated page has been swapped out of the DRAM module 760. Alternatively, a clear bit in the page fault bitmap 762 means that the associated page resides in the DRAM module 760.

For a RDMA read command initiated by the first computing module 702, the RNIC 740 reserves space in the response buffer 742, which may be implemented using static random access memory (SRAM) or high bandwidth memory (HBM). The space in the response buffer 742 is for storing response data resulting from the RDMA read command. The space is reserved prior to sending the command to a target computing module to eliminate the risk of a buffer overflow resulting from the receipt of the data from RDMA read command.

For a RDMA read command relating to work queue element representing a large amount of data, the RNIC 740 may divide the requested data into multiple segments to reduce the amount of reserved spaced required in the response buffer 742 at any given time. For example, each segment may have a segment size of one kilobyte, five-hundred and twelve bytes, or any other suitable size. The RNIC 740 would then send a RDMA read command serially for each segment.

The RNIC 740 may optionally check the page fault bitmap for pages overlapping with the memory address range of the work queue element. If the page fault bitmap indicates that a page is swapped out, the RNIC 740 may initiate a read of a first cache line of the page so that the IOMMU may begin resolve potential page faults.

When a remote RNIC targeted by the RDMA read command receives the read command, it may retrieve the data from the memory region located in the remote RNIC. If a page fault occurs in the remote RNIC, the IOMMU of the processor associated with the remote RNIC may resolve the page fault. Notably, such a page fault in the remote RNIC may result in a delay receiving the data from the RDMA read command due to the page fault but will not result in a buffer overflow.

Upon receipt of the data requested by the RDMA read command, the requesting RNIC 740 may store the requested data into space reserved in the response buffer 742. When response data for a RDMA Read command returns to the local RNIC, the local RNIC stores the response data into its reserved space in the response buffer. Then, the RNIC moves the response data from the response buffer into its memory region via IOMMU. Here, IOMMU can resolve any potential page faults, and it won't cause buffer overflow.

Figure 10:
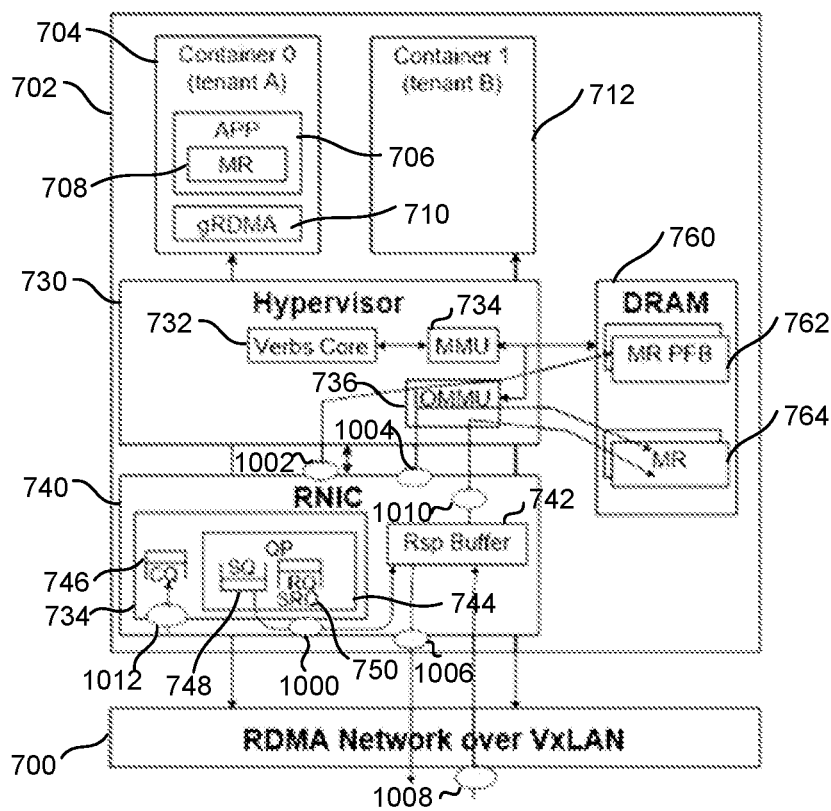
FIG. 10 is the schematic diagram of FIG. 9 further illustrating steps relating to a RDMA read command according to some embodiments of this disclosure.

Referring to FIG. 10, an exemplary embodiment of a RDMA read command is illustrated according to some embodiments disclosed herein. At step 1000, the requesting RNIC 740 retrieves a work queue element from the send queue 478 and stores the work queue element in the response buffer 742. At step 1002, the requesting RNIC 740 reads the page fault bitmap 762 to check for pages overlapping with the address range of the work queue element. At step 1004, if a page in the address range of the work queue element in the page fault bitmap 762 is set meaning that the page has been swapped out, the RNIC 740 reads a first cache line of that page using the IOMMU. The RNIC 740 may use a tuples in the format of ({BDF, PASIDI, gva}) to access the first cache line. The RNIC 740 then waits for the IOMMU 736 to resolve the resulting page fault error and discards the returned cache line data from the DRAM module 760 as a result of the access of the first cache line. At step 1006, the requesting RNIC 740 may generate one or more RDMA read commands from the work queue element, reserve space in the response buffer 742 to store received data from the RDMA read commands, then send the RDMA read commands directed towards other targeted computing devices. At step 1008, the data requested by the RDMA read commands are received from a RNIC of a remote, targeted computing module and are stored in the response buffer 742. Here, the RNIC of the remote, targeted computing module retrieves the data from a target memory range, resolves any pages faults using its IOMMU, and sends the retrieved data to the requesting RNIC 740. At step 1010, the requesting RNIC 740 stores response data into the memory region 764 using the IOMMU 736, which may address any page fault errors. The address format of tuples ({BDF, PASIDr, gva}) may be used. At step 1012, the requesting RNIC 740 may store a completion event in the completion queue 746 upon completion of all RDMA read commands from a work queue element.

A target computing module of a RDMA write command is unable to determine the amount of data associated with the RDMA write command until the command is received. As a result, the response buffer reservation method described above in relation to RDMA read commands for handling page faults is not immediately suitable for RDMA write commands. In some embodiments disclosed herein, RDMA write commands may incorporate a RDMA read command for avoiding instances of RDMA packet discarding due to response buffer overflow.

Figure 11:
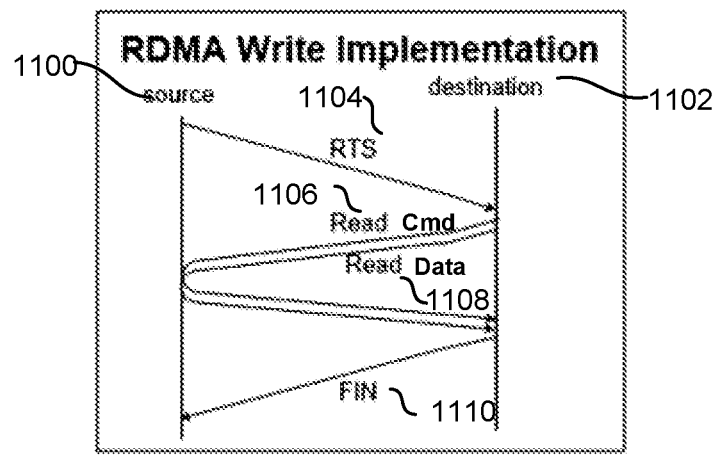
FIG. 11 is a schematic diagram illustrating steps of a RDMA write command according to some embodiments of this disclosure.

Referring to FIG. 11, communication between a RDMA write command source computing module 1100 and a RDMA write command destination 1102 are illustrated. Instead of a RDMA write work queue element from the source computing module 1100 to the destination computing module 1102, the RDMA write work queue element is converted to a number of discrete steps. First, at step 1104, a request to send control command (RTS) is sent from the source computing module 1100 to the destination computing module 1102. In response, at step 1106, one or more RDMA read commands are sent from the destination computing module 1102 to the source computing module 1100, and, at step 1108, read data from one or more RDMA read commands are sent from the source computing module 1100 to the destination computing module 1102. Then, at step 1110, a FIN control command is send from the destination computing module 1102 to the source computing module 1100 indicating that the request to send command has been successfully completed.

In some embodiments disclosed herein, the request to send control command may be implemented as a send command, such a two-sided RDMA command comprising fields such as starting memory address of data source, data length, tag, source and destination queue pair identifiers, or queue pair IDs. Note that the identifier of a memory region, or a memory region ID, and data starting memory address of the destination are not known at the by the data source. However, the processor or container at the data source may have the tag field, and the tag field may therefore be used at the data destination to identify the identifier of the memory region and the data starting memory address at data destination using a process known as tag matching.

RDMA read commands may be used to implement data transfer from the data source to the data destination in this manner. The FIN control command may be implemented as a send command, such as a two-sided RDMA command, to signal completion of the request to send command.

With the integration of a RDMA read command into the RDMA write command, any page faults may be handled through the same mechanisms of the RDMA read command described above. Notably, an important feature of this approach is for the destination computing module 1102 to generate RDMA read commands upon receipt of a request to send command from the source computing module 1100.

Figure 12:
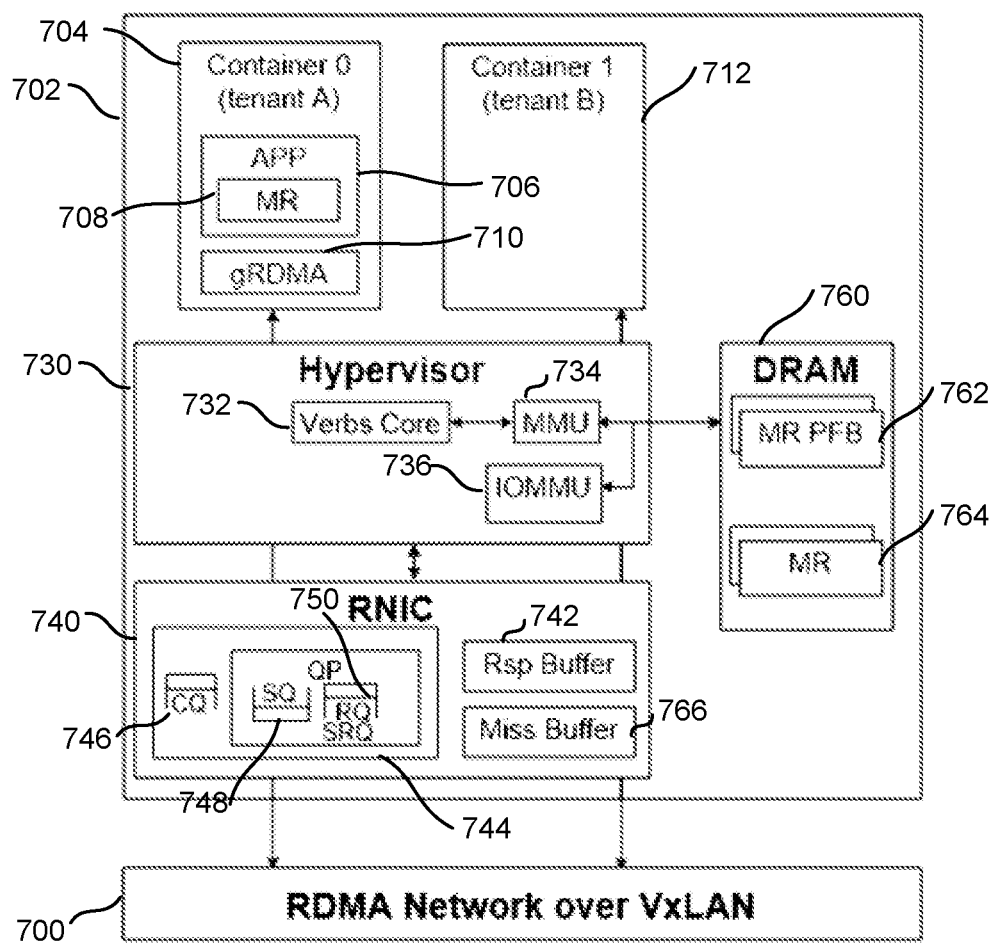
FIG. 12 is the schematic diagram of FIG. 9 further comprising a miss buffer according to some embodiments of this disclosure.

As referenced above, tag matching may be used and is described in more detail as follows. Referring to FIG. 12, first, a hypervisor 730 or container 704 of a computing module at a data destination may post a work queue element to an associated shared receive queue 750. The work queue element may comprise fields such a memory region identifier, a data start memory address at the memory region, and/or the like. Next, upon receiving a request to send command, the RNIC 740 at a data destination extracts a tag field from the request to send command, and searches the shared receive queue for a work queue element with matching tag field. If a work queue element with a matching tag is located, the RNIC 740 generates one or more RDMA read commands from the fields of the matching work queue element and the request to send command. If a work queue element with a matching tag is not located, the RNIC 740 stores the request to send command into a missing buffer 766 and signals the hypervisor 730 or the container 704. Once the hypervisor 730 or container 704 posts the associated work queue element to the shared receive queue 750, the RNIC 740 will extract the tag field from the work queue element and search the miss buffer 766 for a request to send command with a matching tag. If a matching tag is identified, the RNIC 740 generates one or more RDMA read commands from fields of the work queue element and the matching request to send command.

The use of tag matching as described above may be complex and have poor performance at times as the hypervisor 730 or the container 704 may need to be involved. In some embodiments disclosed herein, tag matching is replaced with the use of offset addresses.

In some embodiments disclosed herein, in addition to fields such as starting memory address at a data source, data length, tag, source and destination queue pair IDs, and/or the like a request to send command comprises an additional field, being an offset address at a destination memory region, which is known to the hypervisor 730 or the container 702 at the data source. Of note, an identifier of memory region of the data destination and the base address of the destination memory region are not known to the hypervisor 730 or the container 702 at the data source.

Figure 13:
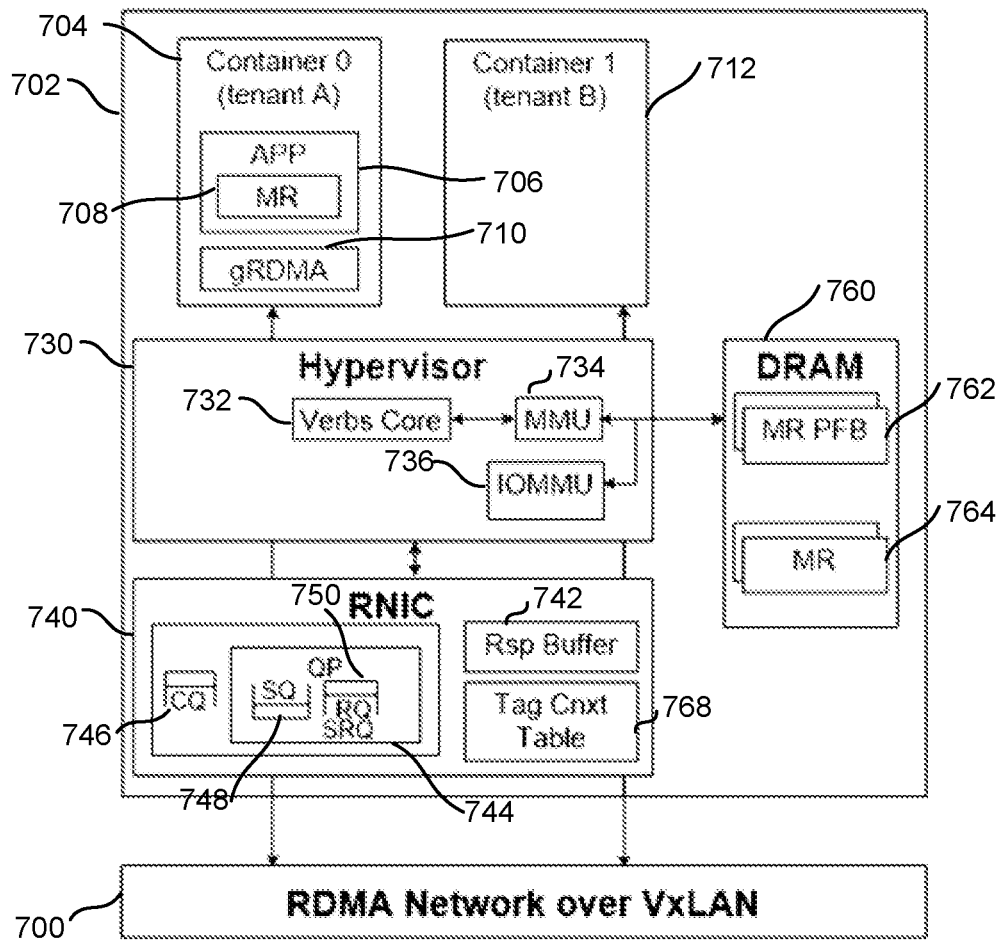
FIG. 13 is the schematic of FIG. 9 further comprising a tag context table according to some embodiments of this disclosure.

Referring to FIG. 13 the RNIC 740 further comprises and maintains a tag context table 768. The tag context table 768 may be indexed either by a tag field or by tuples such as ({destination QP ID, tag}). A entry in the tag context table 768 may store an identifier of an associated memory region at the destination computing module and the base address of the memory region at the destination computing module. The indexing data structure of the tag context table 768 may be implemented in any suitable data structure such as a hash table, radix tree, tree, linear table, and/or the like.

Request to send commands suitable for use with the tag context table 768 may comprise a offset address for the memory region at the destination computing module in addition to other fields, such as start address at the destination computing module, data length, tag, source and destination QP IDs, and/or the like. To generate RDMA read commands from a received request to send command at the destination computing module, the RNIC 740 at the destination computing module may extract the offset address for entry into the tag context table 768 in addition to other fields such as destination QP ID or the tag.

The RNIC 740 may then calculate a starting address in the memory region of the destination computing module being the sum of the memory region base memory and the offset. The RNIC 740 may determine this by referring to the appropriate table entry in the tag context table 768 relating to the request to send command. The RNIC 740 may then generate one or more RDMA read commands using the fields from the request to send command and the calculated starting address in the memory region.

Figure 14:
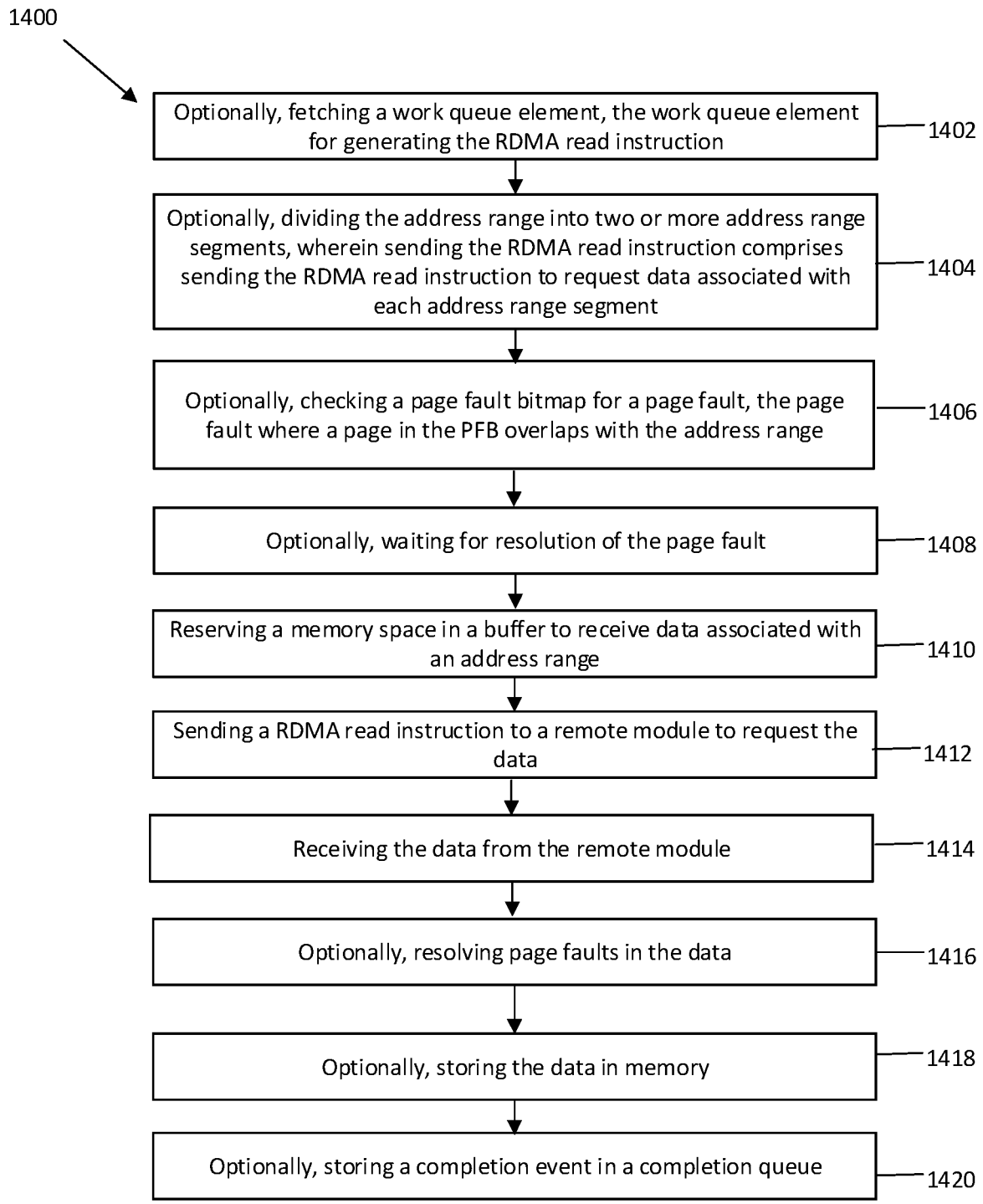
FIG. 14 is block diagram of a method for a RDMA read command according to some embodiments of this disclosure.

FIG. 14 is a flowchart showing the steps of a method 1400, according to some embodiments of the present disclosure. The method 1400 begins with, optionally, fetching a work queue element, the work queue element for generating the RDMA read instruction (step 1402). At step 1404, optionally, dividing the address range into two or more address range segments, wherein sending the RDMA read instruction comprises sending the RDMA read instruction to request data associated with each address range segment. At step 1406, optionally, checking a page fault bitmap for a page fault, the page fault where a page in the page fault bitmap overlaps with the address range. At step 1408, optionally, waiting for resolution of the page fault. At step 1410, reserving a memory space in a buffer to receive data associated with an address range. At step 1412, sending a RDMA read instruction to a remote module to request the data. At step 1414, receiving the data from the remote module. At step 1416, optionally, resolving page faults in the data. At step 1418, optionally, storing the data in memory. At step 1420, optionally, storing a completion event in a completion queue.

Figure 15:
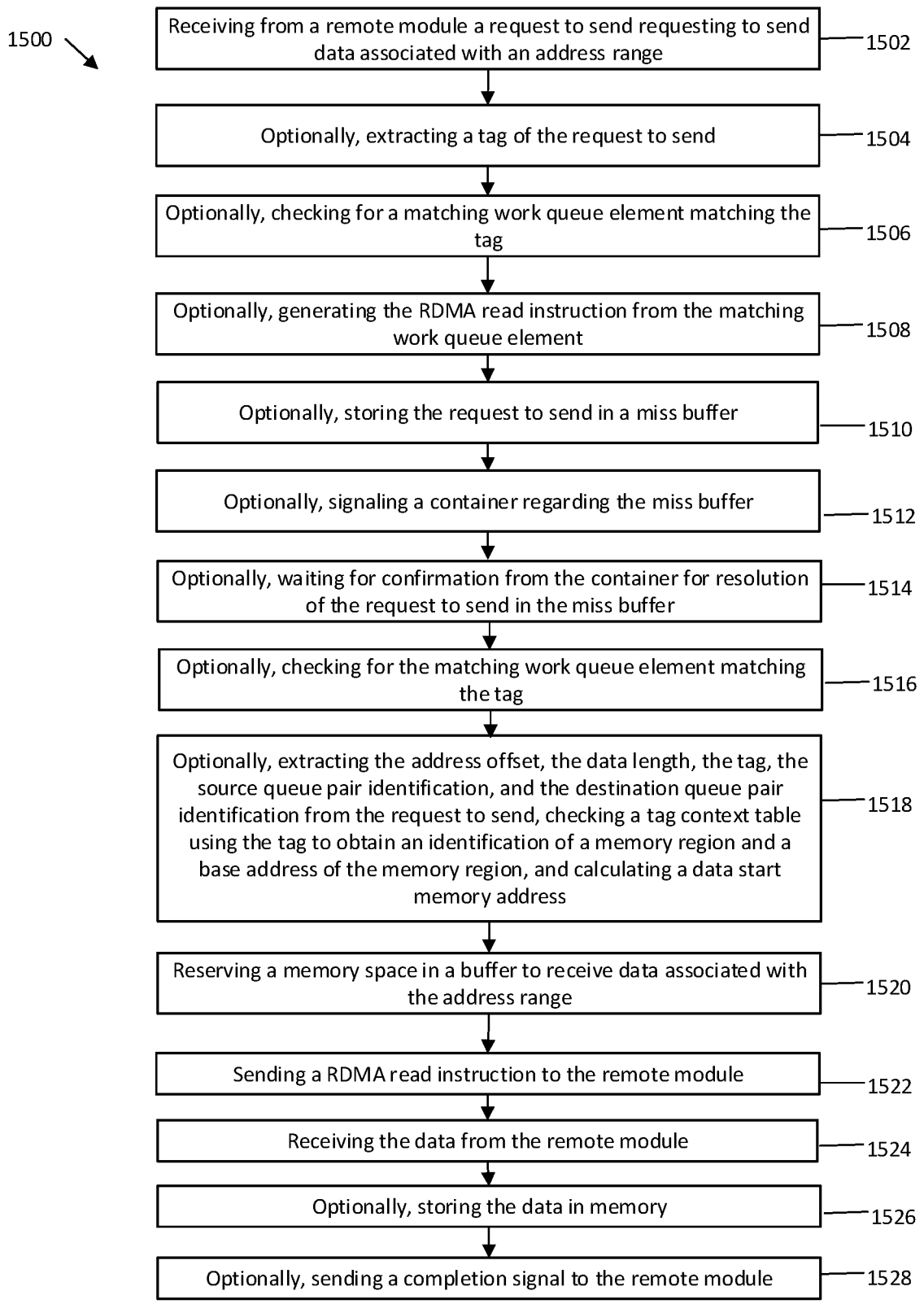
FIG. 15 is block diagram of a method for a RDMA write command according to some embodiments of this disclosure.

FIG. 15 is a flowchart showing steps of a method 1500, according to some embodiments of the present disclosure. The method 1500 begins with receiving from a remote module a request to send command requesting to send data associated with an address range (step 1502). At step 1504, optionally, extracting a tag of the request to send command. At step 1506, optionally, checking for a matching work queue element matching the tag. At step 1508, optionally, generating the RDMA read instruction from the matching work queue element. At step 1510, optionally, storing the request to send command in a miss buffer. At step 1512, optionally, signaling a container regarding the miss buffer. At step 1514, optionally, waiting for confirmation from the container for resolution of the request to send command in the miss buffer. At step 1516, optionally, checking the matching work queue element matching the tag. At step 1518, optionally, extracting the address offset, the data length, the tag, the source queue pair identification, and the destination queue pair identification from the request to send command, checking a tag context table using the tag to obtain an identification of a memory region and a base address of the memory region, and calculating a data start memory address. At step 1520, reserving a memory space in a buffer to receive data associated with the address range. At step 1522, sending a RDMA read instruction to the remote module. At step 1524, receiving the data from the remote module. At step 1526, optionally, storing the data in memory. At step 1528, optionally, sending a completion signal to the remote module.

Although embodiments have been described above with reference to the accompanying drawings, those of skill in the art will appreciate that variations and modifications may be made without departing from the scope thereof as defined by the appended claims.

What is claimed is:

1. A method comprising:
   receiving from a remote module a request to send command requesting to send data associated with an address range;
   reserving a memory space in a buffer to receive data associated with the address range;
   sending a remote direct memory access (RDMA) read instruction to the remote module to request the data;
   receiving the data from the remote module;
   extracting a tag of the request to send command;
   checking for a matching work queue element matching the tag; and
   generating the RDMA read instruction from the matching work queue element;
   wherein the matching work queue element is not found, further comprising:
      storing the request to send command in a miss buffer;
      signaling a container regarding the miss buffer;
      waiting for confirmation from the container for resolution of the request to send command in the miss buffer; and
      checking for the matching work queue element matching the tag.

2. The method of claim 1 further comprising dividing the address range into two or more address range segments, wherein sending the RDMA read instruction comprises sending the RDMA read instruction to request data associated with each address range segment.

3. The method of claim 1 further comprising:
   checking a page fault bitmap for a page fault, the page fault where a page in the page fault bitmap overlaps with the address range; and
   waiting for resolution of the page fault.

4. The method of claim 1 further comprising fetching a work queue element, the work queue element for generating the RDMA read instruction.

5. The method of claim 1 further comprising storing a completion event in a completion queue.

6. The method of claim 1 further comprising:
   extracting an address offset, a data length, a tag, a source queue pair identification, and a destination queue pair identification from the request to send command;
   checking a tag context table using the tag to obtain an identification of a memory region and a base address of the memory region; and
   calculating a data start memory address, wherein the data start memory address is the sum of the base address and the address offset,
   wherein the request to send command comprises the address offset, the data length, the tag, the source queue pair identification, and the destination queue pair identification.

7. The method of claim 1 further comprising sending a completion signal to the remote module.

8. The method of claim 1 further comprising:
checking a page fault bitmap for a page fault, a page fault where a page in the page fault bitmap overlaps with the address range; and
waiting for resolution of the page fault.

9. An apparatus comprising:
a memory; and
one or more processors for executing instructions stored in the memory for performing the method of claim 1.

10. The apparatus of claim 9, wherein the one or more processors are for executing the instructions stored in the memory further for dividing the address range into two or more address range segments, wherein sending the RDMA read instruction comprises sending the RDMA read instruction to request data associated with each address range segment.

11. The apparatus of claim 9, wherein the one or more processors are for executing the instructions stored in the memory further for:
checking a page fault bitmap for a page fault, the page fault where a page in the page fault bitmap overlaps with the address range; and
waiting for resolution of the page fault.

12. The apparatus of claim 9, wherein the one or more processors are for executing the instructions stored in the memory further for fetching a work queue element, the work queue element for generating the RDMA read instruction.

13. One or more non-transitory computer-readable storage devices comprising computer-executable instructions, wherein the instructions, when executed, cause one or more processors to perform the method of claim 1.

14. The one or more non-transitory computer-readable storage devices of claim 13, wherein the instructions, when executed, cause one or more processors to perform:
dividing the address range into two or more address range segments, wherein sending the RDMA read instruction comprises sending the RDMA read instruction to request data associated with each address range segment.

15. The one or more non-transitory computer-readable storage devices of claim 13, wherein the instructions, when executed, cause one or more processors to perform:
checking a page fault bitmap for a page fault, the page fault where a page in the page fault bitmap overlaps with the address range; and
waiting for resolution of the page fault.

16. The one or more non-transitory computer-readable storage devices of claim 13, wherein the instructions, when executed, cause one or more processors to perform:
fetching a work queue element, the work queue element for generating the RDMA read instruction.

17. The one or more non-transitory computer-readable storage devices of claim 13, wherein the instructions, when executed, cause one or more processors to perform:
storing a completion event in a completion queue.

18. The one or more non-transitory computer-readable storage devices of claim 13, wherein the instructions, when executed, cause one or more processors to perform:
extracting an address offset, a data length, a tag, a source queue pair identification, and a destination queue pair identification from the request to send command;
checking a tag context table using the tag to obtain an identification of a memory region and a base address of the memory region; and
calculating a data start memory address, wherein the data start memory address is the sum of the base address and the address offset,
wherein the request to send command comprises the address offset, the data length, the tag, the source queue pair identification, and the destination queue pair identification.

19. The one or more non-transitory computer-readable storage devices of claim 13, wherein the instructions, when executed, cause one or more processors to perform:
sending a completion signal to the remote module.

20. The one or more non-transitory computer-readable storage devices of claim 13, wherein the instructions, when executed, cause one or more processors to perform:
checking a page fault bitmap for a page fault, a page fault where a page in the page fault bitmap overlaps with the address range; and
waiting for resolution of the page fault.

* * * * *